United States Patent
Gupta

(10) Patent No.: US 11,222,377 B2
(45) Date of Patent: Jan. 11, 2022

(54) SMART RECOMMENDATION ENGINE FOR PREVENTING CHURN AND PROVIDING PRIORITIZED INSIGHTS

(71) Applicant: Avast Software s.r.o., Prague (CZ)

(72) Inventor: Rajarshi Gupta, Sunnyvale, CA (US)

(73) Assignee: Avast Software s.r.o., Prague (CZ)

( * ) Notice: Subject to any disclaimer, the term of this patent is extended or adjusted under 35 U.S.C. 154(b) by 160 days.

(21) Appl. No.: 16/146,863

(22) Filed: Sep. 28, 2018

(65) Prior Publication Data

US 2019/0102820 A1   Apr. 4, 2019

Related U.S. Application Data

(60) Provisional application No. 62/566,107, filed on Sep. 29, 2017.

(51) Int. Cl.
G06Q 30/00 (2012.01)
G06Q 30/06 (2012.01)
G06Q 30/02 (2012.01)

(52) U.S. Cl.
CPC ..... G06Q 30/0631 (2013.01); G06Q 30/0251 (2013.01)

(58) Field of Classification Search
None
See application file for complete search history.

(56) References Cited

U.S. PATENT DOCUMENTS

| 8,214,253 | B1 * | 7/2012 | Harris | G06Q 30/0204 705/14.1 |
| 9,137,093 | B1 * | 9/2015 | Abraham | H04L 67/42 |
| 10,049,664 | B1 * | 8/2018 | Indyk | H04L 67/22 |
| 2003/0200135 | A1 | 10/2003 | Wright | |
| 2004/0073520 | A1 | 4/2004 | Eskandari | |
| 2009/0292583 | A1 | 11/2009 | Eilam et al. | |
| 2011/0088003 | A1 | 4/2011 | Swink et al. | |
| 2011/0295649 | A1 * | 12/2011 | Fine | G06Q 30/0201 705/7.29 |
| 2012/0095863 | A1 * | 4/2012 | Schiff | G06Q 30/06 705/26.7 |
| 2013/0054306 | A1 | 2/2013 | Bhalla et al. | |
| 2013/0185245 | A1 * | 7/2013 | Anderson | G06Q 50/00 706/52 |
| 2014/0297580 | A1 | 10/2014 | Javarappa et al. | |
| 2015/0371163 | A1 * | 12/2015 | Noh | G06Q 10/0635 705/7.28 |
| 2016/0217491 | A1 | 7/2016 | Zhu et al. | |
| 2016/0253688 | A1 * | 9/2016 | Nielsen | G06F 16/337 705/7.31 |

* cited by examiner

*Primary Examiner* — Mila Airapetian
(74) *Attorney, Agent, or Firm* — Erickson Kernell IP, LLC; William B. Kircher

(57) ABSTRACT

A recommendation engine can provide recommendations with respect to an application and can provide insights to a user of a computing device. The recommendation engine can receive a prediction based on user engagement with the application during an initial period of time (e.g., a trial period) as to whether the user will convert use of the application to a paid basis (e.g., a subscription or license to the application). An action can be recommended based on the prediction. The recommendation engine can provide insights to a user based on a score associated with the insight. The score can be determined by measuring previous user interactions with the insight over a period of time.

18 Claims, 4 Drawing Sheets

SMART RECOMMENDATION ENGINE FOR PREVENTING CHURN AND PROVIDING PRIORITIZED INSIGHTS

CROSS-REFERENCE TO RELATED APPLICATIONS

This application claims the priority benefit of U.S. Provisional Application Ser. No. 62/566,107, filed on Sep. 29, 2017, entitled "SMART RECOMMENDATION ENGINE FOR PREVENTING CHURN AND PROVIDING PRIORITIZED INSIGHTS," the entire disclosure of which is incorporated herein by reference.

FIELD

The disclosure relates generally to computing systems, and more particularly, to providing recommendations for software to prevent churn or provide prioritized insights to a user.

BACKGROUND

Many software products are provided on a trial basis, either for free or at a reduced price. After the trial period ends, the user may be offered to opportunity to either purchase the software or to pay a periodic subscription fee in order to be licensed to continue to use the software product. For example, in the case of a subscription, the subscription may renew automatically every month, and the subscription fee may appear on the user's phone bill. A problem with supplying software on a trial basis is churn. Churn occurs when a user installs a software product, but at the end of the trial period, discontinues use of the product. A user may also sign up for a paid subscription, but discontinue the subscription after a time. This is considered churn of a paid subscriber.

Additionally, a user can be provided insights about the use of software products or computing devices. For example, a user may be prompted to perform a backup of application data in response to a determination that the data has not been backed up in over a threshold amount of time. Alternatively, the user may be prompted to install applications that are complementary to those already installed.

BRIEF DESCRIPTION OF THE DRAWINGS

For a better understanding of the disclosure, reference may be made to the accompanying drawings in which.

DETAILED DESCRIPTION

Figure 1:
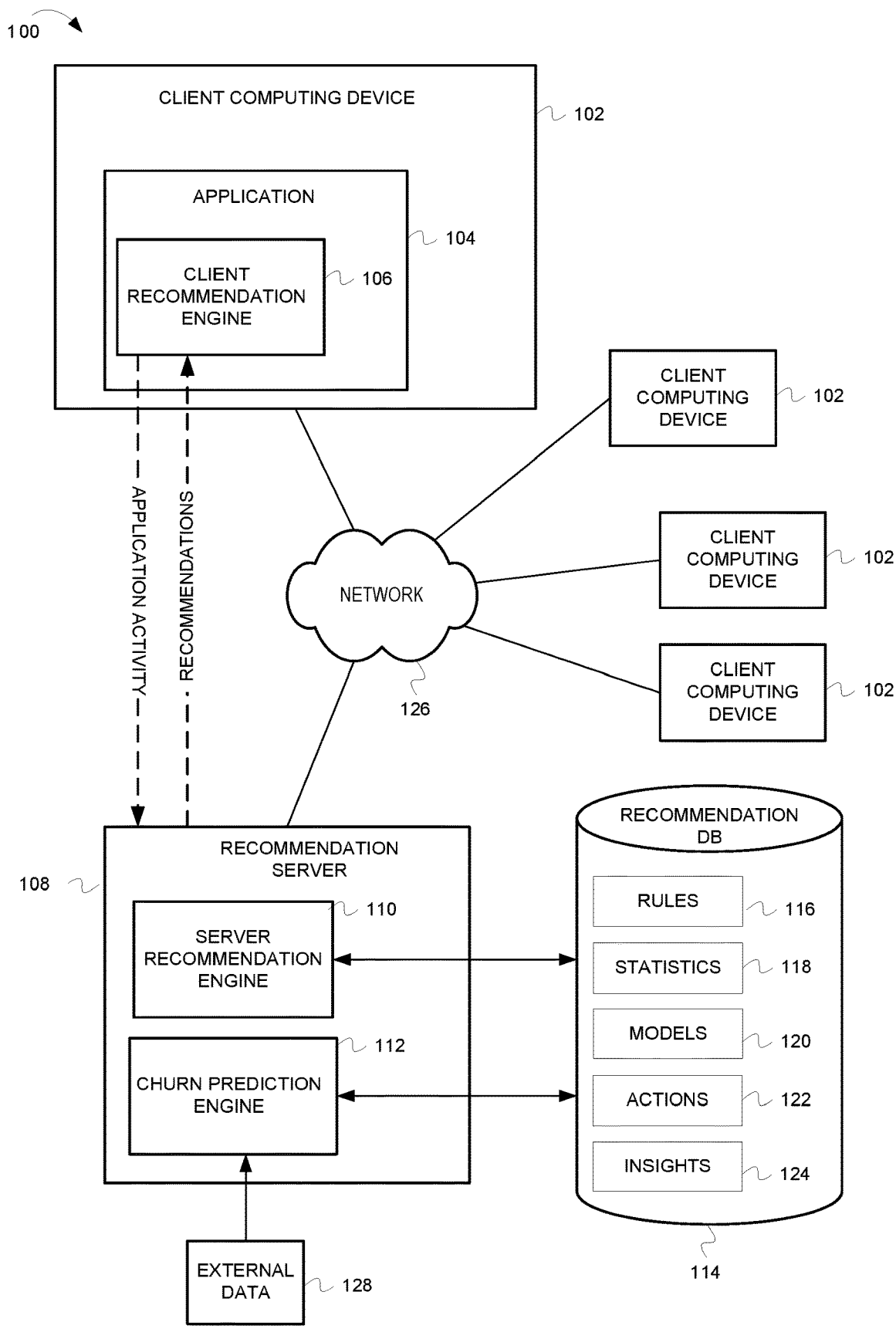
FIG. 1 is a block diagram illustrating a system including a recommendation engine for providing recommendations regarding software programs.

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

FIG. 1 is a block diagram illustrating a system 100 for providing recommendations regarding software applications. In some embodiments, system 100 includes a client computing device 102 and a recommendation server 108 communicably coupled via a network 126. In some aspects, network 126 can be a local area network, wide area network, intranet, or other type of network. In some embodiments, network 126 can be the Internet.

Client computing device 102 and recommendation server 108 can be any type of device with one or more processors to execute software programs. Examples of such devices include a desktop computer, server computer, laptop computer, tablet computer, mainframe computer, smart phone, personal digital assistant, set top box, Internet of Things (IoT) device, or any other computing device capable of executing the methods described herein.

Client computing device 102 can include an application 104 and a client recommendation engine 106. Application 104 can be any type of application installed on client computing device 102. In some embodiments, application 104 can be an application that is installed on a trial basis.

Application 104 can include a client recommendation engine 106. Client recommendation engine 106 can receive activity indicators from application 104. The application on the client computing device 102 can observe and measure many indications of the user's interaction with the application and system. Further, client recommendation engine 106 can receive recommendations and insights from server recommendation engine 108, and can provide the recommendations and insights to a user of application 104.

The activity indicators can vary depending on the application. The activity indicators can include indicators of a user's interaction with an application interface, application functions (whether caused by a user or automatically performed), application results statistics, etc. As an example, consider an application used to track the location of the user and other family members. In this case, activity that can be measured can include how often the user opens the application, checks location, clicks on the location, sets a new location trigger etc. Additionally, accuracy of the location data and the latency of the location data can be measured and included as activity indicators.

As a further example, consider an application used to clean files on the computing device 102. Activity that can be measured can again be a function of the application's functionality. Examples of such activity can include application results statistics such as how many times the user uses the application, how many bad files are found, how many of these are actually deleted by the user etc.

Recommendation server 108 can include a server recommendation engine 110 and a churn prediction engine 112. Additionally, recommendation server 108 can maintain a recommendation database 114. In some aspects, recommendation database 114 can include rules 116, statistics 118, models 120, actions library 122 and insights library 124.

Recommendation server 108 can receive activity indicators from an application 104 via client recommendation engine 106. For example, in some embodiments, a churn prediction engine 112 on recommendation server 108 can receive as input the activity indicators from application 104 and other applications during trial periods for the applications. Information received from an application 104 can be stored as statistics 118. For example, statistics 118 may include statistics derived from the actions described above such as counts of various indicators of a user's interaction with an application interface, counts of application functions performed, application results statistics, etc. Additionally, churn prediction engine 112 can receive external information 128. External information 128 can comprise date, time, day of week, weekend info, etc. External information 128 can also include demographic information about users (age, sex, race, income etc), pay dates, weather information etc. All of the above-described indicators—local and global, immediate and historic, user specific and general population, can be analyzed by a machine learning component of churn prediction engine 112 to determine a score that indicates a likelihood that the user will churn within some time period (e.g. in the next day, week or month). Churn prediction engine 112 can use the input data to update one or more machine learning models 120. In some embodiments, there is a machine learning model 120 per application being measured. Churn prediction engine 112 can compare a particular user's activities during a trial period of an application 104 with information from a model 120 for the application 104 in order to determine a probability regarding whether or not the particular user will go on to subscribe or purchase the application.

Server recommendation engine 110 can use the probability information output from churn prediction engine 112 along with rules 116 to determine an action from actions library 122. For example, if churn prediction engine 112 predicts that there is a high churn probability, i.e., it is probable that that a user will not subscribe or purchase an application after the trial period ends, the recommendation engine can use rules 116 and statistics 118 and/or model 120 to determine whether or not to recommend an action such as offering a discount for the application, providing an offer for a different application, asking for feedback from the user, or displaying ads to the user. If the churn prediction engine predicts that there is a low churn probability, i.e., it is likely that the user will subscribe to or purchase the application, the recommendation engine can use rules 116 and statistics 118 to determine whether to provide an action such as upselling (e.g., inducing the user to purchase more expensive items, upgrades or other add-ons in an attempt to make a more profitable sale), offering other products the user may be interested in, providing loyalty awards, or displaying an advertisement.

In some embodiments, server recommendation engine 110 can deliver insights from insights library 124 to a computing device 102. Examples of insights include information about when and how the device is used, comparison of device usage with a broader population, security information, tips for using the device etc. The server recommendation engine 110 can deliver insights instead of, or in addition to, recommending actions to prevent user churn.

Further details on the operations performed by the components illustrated in FIG. 1 are provided below with reference to methods described in FIGS. 2 and 3. The methods may, in some aspects, constitute computer programs made up of computer-executable instructions. Describing the methods by reference to flowcharts enables one skilled in the art to develop such programs including such instructions to carry out the methods on suitable processors (the processor or processors of the computer executing the instructions from computer-readable media). The methods illustrated in FIGS. 2 and 3 are inclusive of acts that may be taken by an operating environment executing example embodiments of the invention.

Figure 2:
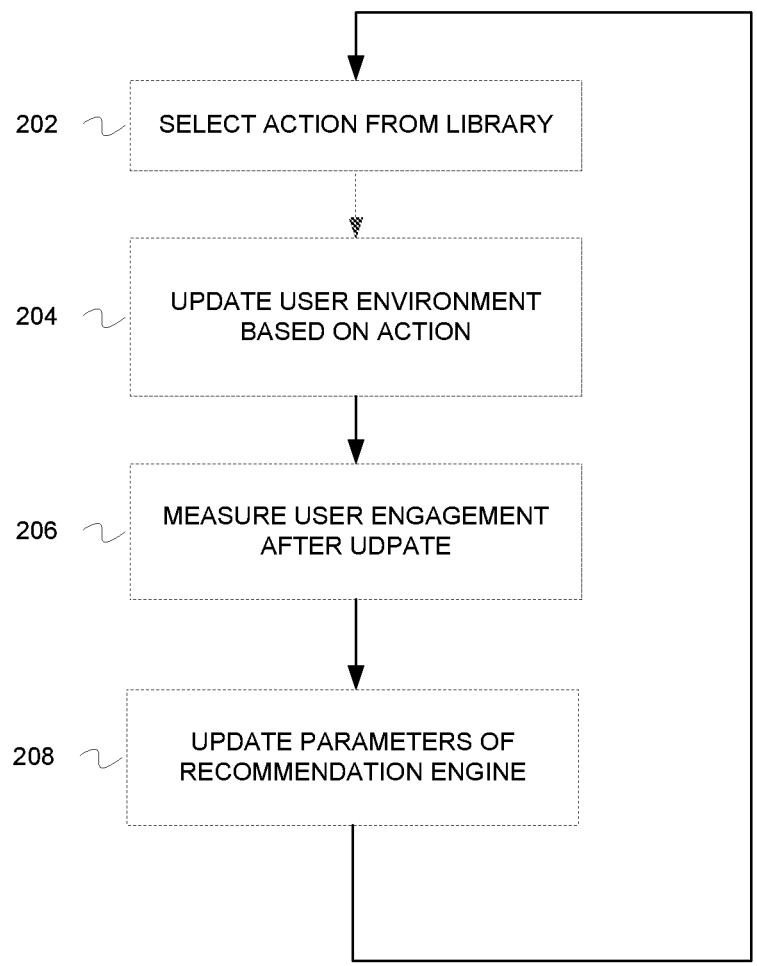
FIG. 2 is a flow chart illustrating operations of a method for providing recommended actions associated with software programs.
Figure 3:
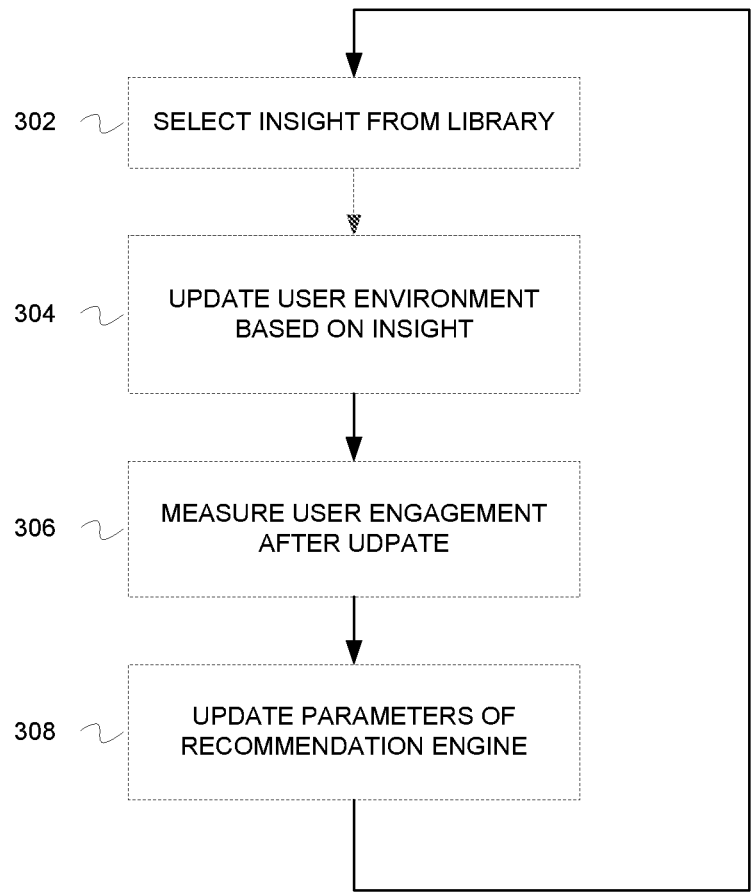
FIG. 3 is a flow chart illustrating operations of a method for providing insights associated with operation of a computing device.

FIG. 2 is a flow chart 200 illustrating operations of a method for providing recommended actions associated with software programs.

At block 202, the server recommendation engine 110 selects an action from an actions library 122. In some embodiments, the server recommendation engine 110 can select an initial action randomly. Random selection can be desirable in the initial stages, because it offers stochastic variance at the possible risk of incurring more penalties. When chosen randomly, some actions may be incorrect, causing the user to be dissatisfied, or at worse uninstall the app. However, this allows the machine learning algorithm to "learn" what are undesirable actions, and thereby optimize the recommendation algorithm. In alternative embodiments, the server recommendation engine can select a best known action at the time of the selection. The best known action can be based on a score associated with the actions in the library of actions. Selection of actions after an initial time period can be based on the best known action at the time.

At block 204, the action selected in block 202 is manifested in the client, thereby changing the application environment for the user. This can take the form of a popup or a change in the color, text or screen of the application.

At block 206, user engagement is measured after the computing device environment is updated. In some embodiments, various types of user engagement can be measured and a score associated with an action can be updated based on the type of user engagement. For example, if the recommended action results in more user interaction with the application, then the score associated with the action can be adjusted upwards. If the recommend action results in less interaction with the application, the score can be adjusted downwards. If the recommended action results in a paid conversion (i.e., purchase or subscription of the application), the score can be adjusted upwards. If the recommended action results in churn (i.e., the user uninstalls or does not purchase/subscribe to the application) the score can be adjusted downwards. The following table illustrates example score adjustments in particular embodiments.

TABLE 1

| Type of engagement | Score adjustment |
|---|---|
| More interaction | +0.2 |
| Less interaction | −0.2 |
| Paid conversion | +1.0 |
| Churn | −1.0 |

The level of interaction may be measured in terms of user interface activity. For example, pointer clicks or other selection mechanisms can be used to measure positive interaction. Swiping away can often be considered a negative interaction.

At block 208, the parameters of the recommendation engine can be updated based on the measured user engagement. For example, scores associated with recommended actions can be updated.

The operations performed at blocks 202-206 can be repeated based on continuing input received from all of the computing devices 102 that communicate with recommendation server 108.

FIG. 3 is a flow chart 300 illustrating operations of a method for providing insights associated with operation of a computing device. An insight can be a recommendation, hint, user guidance, or other information that can be presented to a user while the user is using an application. For example, a user may be provided an insight that prompts the user to perform a backup of application data in response to a determination that the application data has not been backed up in over a threshold amount of time. Alternatively, the user may be prompted to install an application that is complementary to an already installed application. Further, a user may be provided a hint regarding a more efficient way to use an application or a new use for the application.

In some embodiments, user data is collected in the background while the computing device 102 is operating. This may include engagement with the application, demographic information for the user, measurements made about the device (e.g. bandwidth usage, application usage, time of day etc), and global information (like day of week, weather etc). As user data is collected, insights can be generated based on rules 116, statistics 118 and machine learning models 120. Over the course of time, many insights may be generated for a user. However, screen real estate may be limited, especially in the case of mobile devices such as smart phones. In some embodiments, server recommendation engine 110 can use the operations described below to select insights that are determined to be the most valuable.

At block 302, the server recommendation engine 110 selects an insight from the library of insights 124. In some embodiments, the server recommendation engine 110 can select insights randomly for an initial period of time. Selection of insights after the initial time period can be based on the most valuable insights at the time of selection.

At block 304, the computing device environment is updated based on the insight selected at block 302. This can take the form of displaying the selected insights to the user.

At block 306, user engagement is measured after the computing device environment is updated. In some embodiments, various types of user engagement can be measured and a score associated with an insight can be updated based on the type of user engagement. In some embodiments, the insights and scores can be tracked on a per-user basis. For example, if the user clicks on an insight, then the score associated with the insight for that user can be adjusted upwards. If the user swipes away or otherwise dismisses the insight, then the score can be adjusted downwards for that user. If the user takes action on the insight, then the score can be adjusted upwards. For example, taking action on an insight can include following up on the insight by performing the recommended action. The insight may include a button or other user interface that the user can utilize to perform the recommended action. If the user unsubscribes from the insight, then the score can be adjusted downwards. The following table illustrates example score adjustments in particular embodiments.

TABLE 2

| Type of engagement | Score adjustment |
|---|---|
| Click on insight | +0.2 |
| Swipe away from insight | −0.2 |
| Take action on insight | +0.5 |
| Unsubscribe from insight | −1.0 |

At block 308 the parameters of the insight selection engine can be updated based on the measured user engagement. For example, scores associated with the measured insights can be updated.

The operations performed at blocks 302-308 can be repeated based on continuing input received from all of the computing devices 102 that communicate with recommendation server 108.

As will be appreciated from the foregoing, some embodiments can provide advantages over conventional systems. For example, some embodiments can provide a behavioral based recommendation with respect to an application. For example, based on the behavior of previous uses and the behavior of a current user, some embodiments of the recommendation system described can provide recommendation tailored for the user. Such tailored recommendation can result in a more efficient means for a user to utilize their computing device. For example, the user does not waste memory on their computing device with applications that are not likely to be utilized by the user. Further, some embodiments result in a more efficient recommendation system that does not waste time and resources providing recommendations that are not likely to be followed by an end-user.

Figure 4:
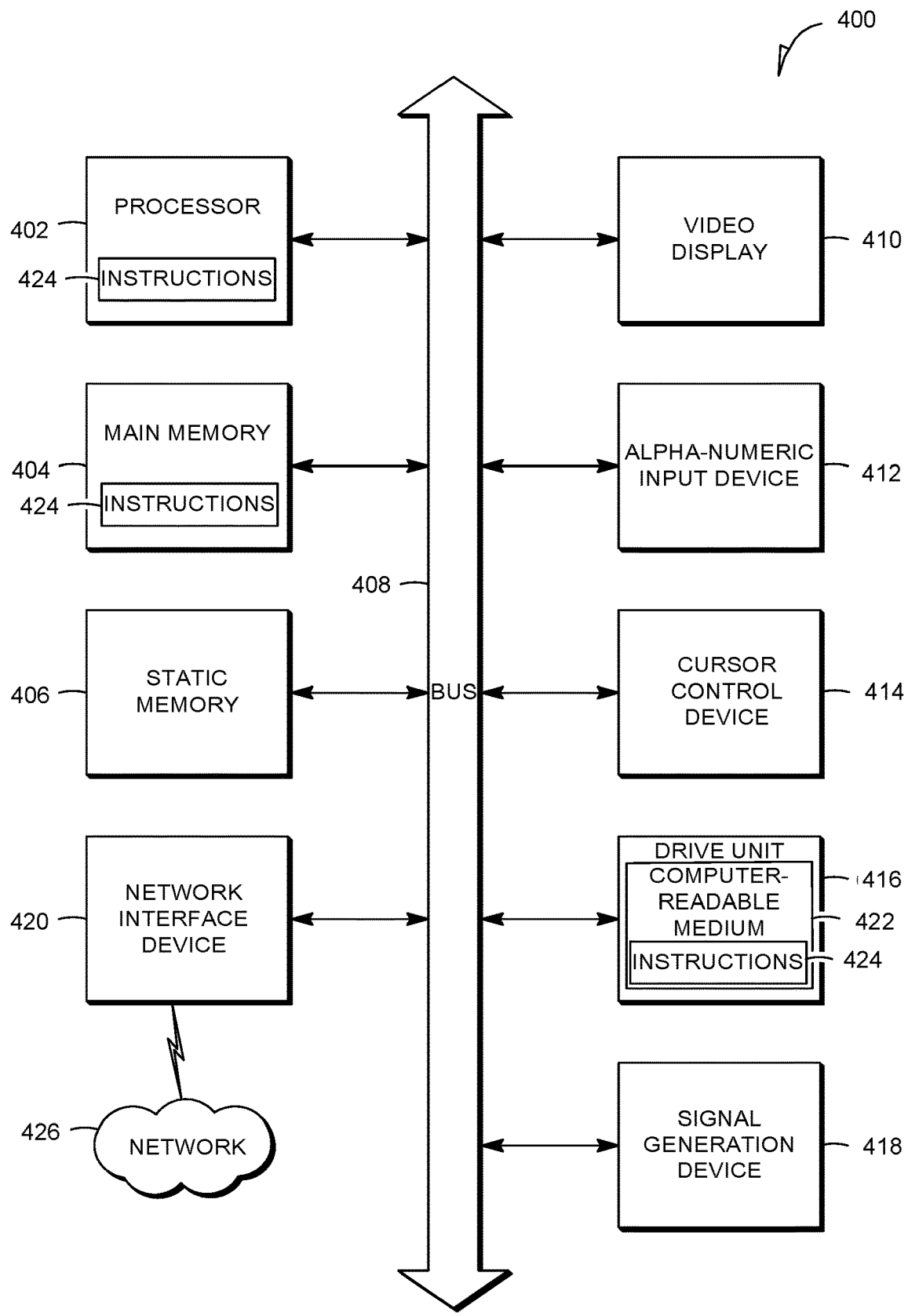
FIG. 4 is a block diagram of an example embodiment of a computer system upon which embodiments of the inventive subject matter can execute.

FIG. 4 is a block diagram of an example embodiment of a computer system 400 upon which embodiments of the inventive subject matter can execute. The description of FIG. 4 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

Moreover, those skilled in the art will appreciate that the aspects of the disclosure may be practiced with other computer system configurations, including hand-held devices, multiprocessor systems, microprocessor-based or programmable consumer electronics, smart phones, network PCs, minicomputers, mainframe computers, and the like. Aspects of the disclosure may also be practiced in distributed computer environments where tasks are performed by I/O remote processing devices that are linked through a communications network. In a distributed computing environment, program modules may be located in both local and remote memory storage devices.

With reference to FIG. 4, an example embodiment extends to a machine in the example form of a computer system 400 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 400 may include a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). In example embodiments, the computer system 400 also includes one or more of an alpha-numeric input device 412 (e.g., a keyboard), a user interface (UI) navigation device or cursor control device 414 (e.g., a mouse), a disk drive unit 416, a signal generation device 418 (e.g., a speaker), and a network interface device 420.

The disk drive unit 416 includes a machine-readable medium 422 on which is stored one or more sets of instructions 424 and data structures (e.g., software instructions) embodying or used by any one or more of the methodologies or functions described herein. The instructions 424 may also reside, completely or at least partially, within the main memory 404 or within the processor 402 during execution thereof by the computer system 400, the main memory 404 and the processor 402 also constituting machine-readable media.

While the machine-readable medium 422 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 424 may further be transmitted or received over a communications network 426 using a signal transmission medium via the network interface device 420 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72 (b) to allow the reader to quickly ascertain the nature and gist of the technical disclosure. The Abstract is submitted with the understanding that it will not be used to limit the scope of the claims.

What is claimed is:

1. A method for preventing application churn, the method comprising:
    receiving one or more indicators of user activity within an application during a time period;

determining, based at least in part, on the one or more indicators of user activity, a likelihood that the user will continue to use the application on a paid basis;

providing an actions library comprising a first set and a second set of recommended actions;

in response to determining that the likelihood that the user will continue to use the application on a paid basis is above a predetermined or configurable threshold, determining a recommended action from the first set of recommended actions; and in response to determining that the likelihood that the user will continue to use the application on a paid basis is below a predetermined or configurable threshold, determining a recommended action from the second set of recommended actions.

2. The method of claim 1, wherein said receiving the one or more indicators of user activity comprises receiving an indication of at least one of opening the application, clicking on a user interface element of the application, opening a file by the application, and application operation statistics.

3. The method of claim 1, further comprising determining the likelihood based, at least in part, on information external to the application.

4. The method of claim 3, wherein the information external to the application comprises at least one of date, time, day of week, demographic information about a user, pay date, or weather information.

5. The method of claim 1, wherein said determining the recommended action from the first set of recommended actions comprises providing a recommendation for an upgrade to the application.

6. The method of claim 1, wherein said determining the recommended action from the second set of recommended actions comprises at least one of providing a discount for the application, providing a recommendation of a second application, providing a feedback prompt to a user, or providing an advertisement to the user.

7. A non-transitory machine-readable storage medium having stored thereon computer-executable instructions for observing device events, the computer-executable instructions to cause one or more processors to perform operations comprising:

receive one or more indicators of user activity within an application during a time period;

determine, based at least in part, on the one or more indicators of user activity, a likelihood that the user will continue to use the application on a paid basis;

provide an actions library comprising a first set and a second set of recommended actions;

in response to a determination that the likelihood that the user will continue to use the application on a paid basis is above a predetermined or configurable threshold, determine a recommended action from the first set of recommended actions; and in response to a determination that the likelihood that the user will continue to use the application on a paid basis is below the predetermined or configurable threshold, determine a recommended action from the second set of recommended actions.

8. The non-transitory machine-readable storage medium of claim 7, wherein the operations to receive the one or more indicators of user activity comprise operations to receive an indication of at least one of opening the application, clicking on a user interface element of the application, opening a file by the application, and application operation statistics.

9. The non-transitory machine-readable storage medium of claim 7, wherein the operations further comprise operations to determine the likelihood based, at least in part, on information external to the application.

10. The non-transitory machine-readable storage medium of claim 9, wherein the information external to the application comprises at least one of date, time, day of week, demographic information about a user, pay date, or weather information.

11. The non-transitory machine-readable storage medium of claim 7, wherein the operations to determine the recommended action from the first set of recommended actions comprise operations to provide a recommendation for an upgrade to the application.

12. The non-transitory machine-readable storage medium of claim 7, wherein the operations to determine the recommended action from the second set of recommended actions comprise operations to perform at least one of provide a discount for the application, provide a recommendation of a second application, provide a feedback prompt to a user, or provide an advertisement to the user.

13. A system for preventing application churn, the system comprising:

one or more processors; and a non-transitory machine-readable medium having stored thereon computer-executable instructions to cause the one or more processors to:

receive one or more indicators of user activity within an application during a time period;

determine, based at least in part, on the one or more indicators of user activity, a likelihood that the user will continue to use the application on a paid basis;

provide an actions library comprising a first set and a second set of recommend actions;

in response to a determination that the likelihood that the user will continue to use the application on a paid basis is above a predetermined or configurable threshold, determine a recommended action from the first set of recommended actions; and in response to a determination that the likelihood that the user will continue to use the application on a paid basis is below the predetermined or configurable threshold, determine a recommended action from the second set of recommended actions.

14. The system of claim 13, wherein the computer-executable instructions to receive the one or more indicators of user activity comprise instructions to receive an indication of at least one of opening the application, clicking on a user interface element of the application, opening a file by the application, and application operation statistics.

15. The system of claim 13, wherein the computer-executable instructions further comprise instructions to determine the likelihood based, at least in part, on information external to the application.

16. The system of claim 15, wherein the information external to the application comprises at least one of date, time, day of week, demographic information about a user, pay date, or weather information.

17. The system of claim 13, wherein the computer-executable instructions to determine the recommended action from the first set of recommended actions comprise instructions to provide a recommendation for an upgrade to the application.

18. The system of claim 13, wherein the computer-executable instructions to determine the recommended action from the second set of recommended actions comprise instructions to perform at least one of provide a discount for the application, provide a recommendation of a second application, provide a feedback prompt to a user, or provide an advertisement to the user.

* * * * *